United States Patent
Yamashita et al.

(10) Patent No.: US 10,995,252 B2
(45) Date of Patent: *May 4, 2021

(54) VINYL ALCOHOL POLYMER AND CEMENT SLURRY COMPRISING SAME

(71) Applicant: DENKA COMPANY LIMITED, Tokyo (JP)

(72) Inventors: Akihiro Yamashita, Niigata (JP); Kosuke Watanabe, Niigata (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,133

(22) Filed: Mar. 20, 2020

(65) Prior Publication Data

US 2020/0224076 A1 Jul. 16, 2020

Related U.S. Application Data

(63) Continuation of application No. PCT/JP2019/003766, filed on Feb. 4, 2019.

(30) Foreign Application Priority Data

Feb. 22, 2018 (JP) .............................. JP2018-029581

(51) Int. Cl.
| | |
|---|---|
| C09K 8/44 | (2006.01) |
| C04B 24/26 | (2006.01) |
| C08F 218/08 | (2006.01) |
| C08F 218/04 | (2006.01) |
| C09K 8/487 | (2006.01) |

(52) U.S. Cl.
CPC ............. C09K 8/44 (2013.01); C04B 24/2635 (2013.01); C08F 218/04 (2013.01); C08F 218/08 (2013.01); C09K 8/487 (2013.01)

(58) Field of Classification Search
CPC ...... C09K 8/44; C04B 24/2635; C08F 218/08

USPC .......................................... 523/130
See application file for complete search history.

(56) References Cited

U.S. PATENT DOCUMENTS

| | | |
|---|---|---|
| 2007/0284104 A1 | 12/2007 | Beckman |
| 2016/0083490 A1* | 3/2016 | Kumaki ................. C08J 3/00 525/330.6 |
| 2016/0264841 A1 | 9/2016 | Muthusamy et al. |
| 2017/0174971 A1 | 6/2017 | Kumaki et al. |
| 2018/0243706 A1 | 8/2018 | Kaneshima et al. |
| 2018/0362404 A1 | 12/2018 | Saka et al. |
| 2020/0157289 A1 | 5/2020 | Sugimura et al. |

FOREIGN PATENT DOCUMENTS

| | | | |
|---|---|---|---|
| CA | 3023838 A1 * | 11/2017 | ......... C04B 24/2623 |
| CA | 3023838 A1 | 11/2017 | |
| JP | 6-329455 A | 11/1994 | |
| JP | 2000302808 A | 10/2000 | |
| JP | 2003221267 A | 8/2003 | |
| JP | 2015196733 A | 11/2015 | |
| JP | 2016079308 A | 5/2016 | |
| JP | 2017500262 A | 1/2017 | |
| WO | 2007146348 A2 | 12/2007 | |
| WO | 2017099082 A1 | 6/2017 | |
| WO | 2017195855 A1 | 11/2017 | |

OTHER PUBLICATIONS

English Abstract for JP 2016079308 A (2016).
English Abstract for JP 6-329455 A (1994).
English Abstract for JP 2000302808 A (2000).
English Abstract for JP 2003221267 A (2003).

* cited by examiner

*Primary Examiner* — Michael Bernshteyn
(74) *Attorney, Agent, or Firm* — Caesar Rivise, PC

(57) ABSTRACT

Provided is a vinyl alcohol polymer having good fluid loss reducing performance. The vinyl alcohol polymer is a saponified product of a copolymer of a vinyl ester monomer and a multifunctional monomer, and has a degree of saponification of 70 to 95 mol % and a viscosity-average degree of polymerization of 1000 to 10000.

5 Claims, No Drawings

VINYL ALCOHOL POLYMER AND CEMENT SLURRY COMPRISING SAME

CROSS-REFERENCE TO RELATED APPLICATIONS

This application is a continuation of PCT/JP2019/003766, filed Feb. 4, 2019, which claims priority from JP 2018-029581, filed Feb. 22, 2018, the contents of which applications are incorporated herein by reference in their entireties for all purposes

TECHNICAL FIELD

The present invention relates to an additive for oil well cement, containing a vinyl alcohol polymer. The present invention also relates to a cement slurry using the additive for oil well cement.

BACKGROUND ART

The oil well cement used in cementing of an oil well, a gas well, a steam well for geothermal power generation, and the like is filled into a gap between a steel pipe and a well to protect the steel pipe (casing). Loss of contained water from a cement slurry due to high pressure at the time of injection and geothermal heat is typically referred to as "fluid loss." Fluid loss impairs the fluidity of the cement slurry and the strength after curing, and hence a fluid loss reducing agent is usually added to the cement slurry.

As an example of the fluid loss reducing agent, use of polyvinyl alcohol (hereinafter also referred to as "PVA") is known. In recent years, as shale gas wells have particularly been mined deeper, the pressure and the temperature conditions have become more stringent, and the amount of the fluid loss reducing agent added has been increased correspondingly.

However, due to a decrease in fluidity caused by thickening of the cement slurry and an increase in cost, improvement in fluid loss reducing the performance of the fluid loss reducing agent is required.

CITATION LIST

Patent Literature

Patent Literature 1: International Publication No. WO2007/146348
Patent Literature 2: Japanese Patent Laid-Open No. 2015-196733

SUMMARY OF INVENTION

Technical Problem

Patent Literatures 1 and 2 each disclose PVA used in the fluid loss reducing agent. Actually, these fluid loss reducing agents containing PVA do not realize the fluid loss reducing performance required for the cement slurry injected under high temperature and high pressure.

Thus, the main object of the present invention is to provide an additive for oil well cement, containing a vinyl alcohol polymer, the additive having good fluid loss reducing performance.

Solution to Problem

That is, the present invention provides an additive for oil well cement, comprising a vinyl alcohol polymer, wherein the vinyl alcohol polymer is a saponified product of a copolymer of a vinyl ester monomer and a multifunctional monomer, and has a degree of saponification of 70 to 95 mol % and a viscosity-average degree of polymerization of 1000 to 10000.

The multifunctional monomer may have a carbonyl group or an amide group.

The multifunctional monomer may be triallyl isocyanurate.

A structural unit derived from the multifunctional monomer in the vinyl alcohol polymer may be 0.001 to 1.0 mol % per 100 mol % of a structural unit derived from the vinyl ester monomer.

The content of the vinyl alcohol polymer having a particle size of 75 μm or less may be 30 mass % or less, and/or the content of the vinyl alcohol polymer having a particle size of 500 μm or more may be 10 mass % or less.

The present invention provides a cement slurry comprising 0.01 to 30% bwoc of the additive for oil well cement.

Advantageous Effects of Invention

According to the present invention, an additive for oil well cement, containing a vinyl alcohol polymer, the additive having good fluid loss reducing performance, is provided.

DESCRIPTION OF EMBODIMENTS

Hereinafter, the embodiments of the present invention will be described in detail. However, the present invention is not limited to the embodiments described below.

The additive for oil well cement according to one embodiment of the present invention is preferable as an additive for the oil well cement used in cementing an oil well, a gas well, a steam well for geothermal power generation, or the like. The additive for oil well cement of the present embodiment comprises a vinyl alcohol polymer that is obtained by copolymerization of a vinyl ester monomer and a multifunctional monomer and in which the degree of saponification and the viscosity-average degree of polymerization are controlled.

The process of "cementing" in drilling of a well refers to an operation of injecting cement into a gap between a drilled well and a steel pipe inserted to the well. The cementing widely employs a method in which cement and various additives are mixed in a dried state and then the mixture is pumped while being slurried with high-pressure water. When a vinyl alcohol polymer is used as a fluid loss reducing agent among additives, loss of contained water from the cement slurry during cementing can be reduced (that is, the fluid loss may be reduced) and enables the fluidity of the cement slurry to be maintained. When the amount of the fluid loss is great, the fluidity of the cement slurry is lost, which makes sufficient cementing difficult.

The fluid loss is a physical property of the oil well cement defined by American Petroleum Institute (API). The testing method for the fluid loss is described in *Recommended Practice for Testing Well Cements, API Recommended Practice* 10B-2, April 2013.

The vinyl alcohol polymer used in the additive for oil well cement of the present embodiment is the polymer obtained by saponifying the copolymer of a vinyl ester monomer and a multifunctional monomer. The vinyl alcohol polymer has the degree of saponification of 70 to 95 mol % and the viscosity-average degree of polymerization of 1000 to 10000. In the vinyl alcohol polymer, the particle size is further preferably controlled.

The copolymer of the vinyl ester monomer and the multifunctional monomer may further be copolymerized with a monomer other than the vinyl ester monomer, which is copolymerizable with the vinyl ester monomer and the multifunctional monomer, unless it would not impair the effects of the present invention.

The vinyl ester monomer may include, for example, vinyl acetate, vinyl propionate, vinyl valerate, vinyl caproate, vinyl laurate, vinyl stearate, vinyl benzoate, vinyl pivalate, and the like, or may be a mixture thereof. From the viewpoint of the ease of polymerization, vinyl acetate is preferable as the vinyl ester monomer.

Examples of a monomer, other than the vinyl ester monomer, copolymerizable with the vinyl ester monomer may include α-olefin monomers such as ethylene and propylene; (meth)acrylic acid alkyl ester monomers such as methyl (meth)acrylate, ethyl (meth)acrylate, butyl (meth)acrylate, and 2-ethylhexyl (meth)acrylate; unsaturated amide monomers such as (meth)acrylamide and N-methylol acrylamide; unsaturated carboxylic monomers such as (meth)acrylic acid, crotonic acid, maleic acid, itaconic acid, and fumaric acid; alkyl (e.g. methyl, ethyl, and propyl) ester monomers of unsaturated carboxylic acids; anhydrides of unsaturated carboxylic acids such as maleic anhydride; salts of unsaturated carboxylic acids with sodium, potassium, ammonium, and the like; glycidyl group-containing monomers such as allyl glycidyl ether and glycidyl (meth)acrylate; sulfonic acid group-containing monomers such as 2-acrylamide-2-methylpropanesulfonic acid or salts thereof; phosphate group-containing monomers such as acid phosphoxyethyl acrylate and acid phosphoxypropyl methacrylate; and alkyl vinyl ether monomers.

The multifunctional monomer to be copolymerized with the vinyl ester monomer is not particularly limited, and may include a compound that has two or more polymerizable unsaturated bonds per molecule. Examples thereof may include divinyl ether such as propanediol divinyl ether, butanediol divinyl ether, ethylene glycol divinyl ether, diethylene glycol divinyl ether, triethylene glycol divinyl ether, polyethylene glycol divinyl ether, propylene glycol divinyl ether, and polypropylene glycol divinyl ether; and divinylsulfonic acid compounds.

Examples of the multifunctional monomer to be copolymerized with the vinyl ester monomer may also include diene compounds such as pentadiene, hexadiene, heptadiene, octadiene, nonadiene, and decadiene; diallyl ether compounds such as glycerol diallyl ether, diethylene glycol diallyl ether, ethylene glycol diallyl ether, triethylene glycol diallyl ether, polyethylene glycol diallyl ether, trimethylol propane diallyl ether, and pentaerythritol diallyl ether; triallyl ether compounds such as allyl methacrylate, glycerol triallyl ether, trimethylol propane triallyl ether, and pentaerythritol triallyl ether; tetraallyl ether compounds such as pentaerythritol tetraallyl ether; monomers containing an allyl ester group such as diallyl phthalate, diallyl maleate, diallyl itaconate, diallyl terephthalate, and diallyl adipate; monomers containing an allylamino group, for example, diallylamine compounds such as diallylamine and diallylmethylamine, and triallylamine; monomers containing an allylammonium group, for example, diallylammonium salts such as diallyldimethylammonium chloride; monomers containing two or more allyl groups such as triallyl isocyanurate, 1,3-diallyl urea, triallyl phosphate, and diallyldisulphide.

Furthermore, examples of the multifunctional monomer to be copolymerized with the vinyl ester monomer may include monomers having a (meth)acrylic acid such as ethylene glycol di(meth)acrylate, diethylene glycol di(meth)acrylate, triethylene glycol di(meth)acrylate, polyethylene glycol di(meth)acrylate, propylene glycol di(meth)acrylate, polypropylene glycol di(meth)acrylate, glycerol di(meth)acrylate, glycerol tri(meth)acrylate, pentaerythritol tri(meth)acrylate, trimethylol propane tri(meth)acrylate, ditrimethylol propane tetra(meth)acrylate, pentaerythritol tetra(meth)acrylate, dipentaerythritol hexa(meth)acrylate, and isocyanuric acid tri(meth)acrylate; monomers having (meth)acrylamide such as N,N'-methylenebis(meth)acrylamide and N,N'-ethylene-bis(meth)acrylamide; divinyl benzene and trivinyl benzene.

Among these multifunctional monomers, triallyl isocyanurate or allyl methacrylate, that have a carbonyl group or an amide group in the molecule, is preferred from the viewpoint of the reactivity with the vinyl ester monomer. In particular, triallyl isocyanurate is preferred from the viewpoint of being difficult to decompose in the saponification reaction and the like.

The amount of copolymerization of the multifunctional monomer in the vinyl alcohol polymer, that is, the structural unit derived from the multifunctional monomer in the vinyl alcohol polymer is preferably 0.001 to 1.0 mol % per 100 mol % of the structural unit derived from the vinyl ester monomer in the vinyl alcohol polymer. The structural unit derived from the multifunctional monomer may preferably be 0.005 to 0.5 mol %, further preferably 0.01 to 0.2 mol %. If the amount of copolymerization of the multifunctional monomer is 0.001 mol % or more, the effect of reducing fluid loss may be more sufficiently exhibited. If the amount is 1.0 mol % or less, the vinyl alcohol polymer hardly forms excess crosslinked structures, resulting in good workability, in addition to providing the effect of reducing fluid loss.

The amount of copolymerization of the multifunctional monomer may be calculated by using $^{13}$C-NMR. The calculation procedure of the amount of copolymerization if the multifunctional monomer is triallyl isocyanurate will be described as an example.

The vinyl alcohol polymer copolymerized with triallyl isocyanurate is washed thoroughly with methanol, air dried at 90° C. for 1 hour, and then dissolved in heavy water to prepare a solution with a concentration of 10 mass %.

By using 500 MHz $^{13}$C-NMR ("AV-III HD 500" manufactured by Bruker) equipped with a DCH cryoprobe, $^{13}$C-NMR spectrum is obtained from the resulting solution at a measurement temperature of 80° C. and accumulation of 20000 times.

Based on the spectrum obtained, the integral value of peaks (30 to 50 ppm) of the backbone methylene groups not adjacent to hydroxy groups in the vinyl alcohol polymer copolymerized with triallyl isocyanurate is defined as b and the integral value of peaks (150 to 155 ppm) based on carbonyl groups in triallyl isocyanurate is defined as a. The amount of copolymerization of triallyl isocyanurate X (mol %) in the vinyl alcohol polymer copolymerized with triallyl isocyanurate is calculated by the formula (1).

$$X=((1/3)a/b) \times 100 \tag{1}$$

The polymerization method of the vinyl ester monomer and the multifunctional monomer is not particularly limited, and known polymerization methods such as solution polymerization, suspension polymerization, and bulk polymerization may be used. Use of a solution polymerization method performed in alcohol is preferable, from the viewpoint of the ease of operation and the availability of a common solvent with the saponification reaction in the next step. As the alcohol, methanol is particularly preferably used.

The degree of saponification of the vinyl alcohol polymer used in the present embodiment is 70 to 95 mol %. If the degree of saponification is less than 70 mol %, the hydrophobicity of the remaining acetyl groups is too strong, and if the degree of saponification is more than 95 mol %, hydrogen bonds between molecules of the vinyl alcohol polymer are too strong. In both cases, the affinity with water is lowered, which makes the effect of reducing fluid loss insufficient.

From the viewpoint of the effect of reducing fluid loss, the degree of saponification may preferably be 75 to 90 mol %.

As used herein, the term "degree of saponification" refers to a value calculated by measuring according to Japan Industrial Standard JIS K 6726, Section 3.5 *"Degree of Saponification"*.

The saponification reaction is performed by dissolving the copolymer of the vinyl ester monomer and the multifunctional monomer in alcohol and adding an alkali catalyst or an acid catalyst thereto. Examples of the alcohol may include methanol, ethanol, and butanol. As mentioned above, use of methanol is particularly preferable.

The concentration of the vinyl ester polymer in alcohol may preferably be at a concentration of 5 to 80% solids. The alkali catalyst may include, for example, hydroxides of alkali metals such as sodium hydroxide, potassium hydroxide, sodium methylate, sodium ethylate, and potassium methylate, and alkali catalysts such as alcoholate. The acid catalyst may include, for example, aqueous solutions of inorganic acids such as hydrochloric acid and sulfuric acid, and organic acids such as p-toluenesulfonic acid. The amount used of these catalysts may preferably be 0.1 to 100 millimole equivalents based on the structural unit derived from the vinyl ester monomer. The reaction temperature during saponification may preferably be in the range of 10 to 70° C., more preferably in the range of 30 to 50° C. The reaction time may preferably be 1 to 10 hours.

The viscosity-average degree of polymerization of the vinyl alcohol polymer is 1000 to 10000, preferably 1500 to 6000, more preferably 2000 to 5000. Too low viscosity-average degree of polymerization makes the effect of reducing fluid loss insufficient, and too high viscosity-average degree of polymerization lowers fluidity due to an increase in the viscosity of the cement slurry.

The term "viscosity-average degree of polymerization" refers to a value calculated by the following formula (2) from the intrinsic viscosity [η] (g/dL) measured at 30° C. with an Oswald viscometer using ion exchange water as a solvent.

$$\log(P)=1.613\times\log([\eta]\times 104/8.29) \quad (2)$$

wherein, P represents the viscosity-average degree of polymerization.

The content of the vinyl alcohol polymer having a particle size of 75 μm or less may preferably be 30 mass % or less, more preferably 25 mass % or less, further preferably 15 mass % or less. By adjusting the content of the vinyl alcohol polymer having a particle size of 75 μm or less to 30 mass % or less, the dissolution rate of the vinyl alcohol polymer in the cement slurry does not become too fast and the deterioration of fluid loss reducing performance may be inhibited.

The content of the vinyl alcohol polymer having a particle size of 500 μm or more may preferably be 10 mass % or less, more preferably 8 mass % or less, further preferably 5 mass % or less. By adjusting the content of the vinyl alcohol polymer having a particle size of 500 μm or more to 10 mass % or less, the vinyl alcohol polymer is less likely to become a defected portion upon curing of the cement and thus the reduction in the strength of a cured product of cement is less likely to occur.

Cement slurry according to an embodiment of the present invention contains a certain amount of the additive for oil well cement described above.

The method of adding the vinyl alcohol polymer into the cement slurry is not particularly limited, and conventional methods such as a method of mixing with a dried cement composition in advance and a method of mixing in the preparation of a cement slurry are employed.

The content of the vinyl alcohol polymer in the cement slurry is 0.01 to 30% bwoc, preferably 0.05 to 10% bwoc, more preferably 0.1 to 5% bwoc. Note that the abbreviation "bwoc" stands for "by weight of cement," and refers to the weight of the additive in dry form to be added to a cement composition, only based on the solids content of the cement.

EXAMPLES

Hereinafter, the present invention will be described in detail with reference to Examples, but the present invention is not limited thereto. Unless stated otherwise, the terms "parts" and "%" mean "parts by mass" and "mass %," respectively.

Preparation of Vinyl Alcohol Polymer

Example 1

In a polymerization tank equipped with a reflux condenser, a dropping funnel, and a stirrer, 100 parts by mass of vinyl acetate, 0.01 parts by mass of triallyl isocyanurate, 17.0 parts by mass of methanol, and 0.07 parts by mass of Peroyl NPP (Nippon Oil & Fats Co., Ltd.) were placed, and polymerization was performed at the boiling point for 5 hours while stirring under a nitrogen stream. When the conversion rate of vinyl acetate reached 50%, polymerization was stopped and unreacted vinyl acetate was removed outside the polymerization system by a conventional method. A methanol solution of the vinyl acetate polymer was obtained, and the viscosity-average degree of polymerization was 5900.

To the methanol solution of the vinyl acetate polymer obtained above, a methanol solution of sodium hydroxide (0.007 in terms of moles of sodium hydroxide relative to the structural unit derived from vinyl acetate) was added, and a saponification reaction was performed at 45° C. for 90 minutes. The reaction solution obtained was dried by heating, and a vinyl alcohol polymer of Example 1 was obtained. The vinyl alcohol polymer had the degree of saponification of 80.0 mol %.

The dried vinyl alcohol polymer was subjected to primary grinding by a grinder, and then sieved by using a sieve having an opening of 500 μm. The on-sieve products were subjected to grinding again by a grinder and mixed well with previously obtained the under-sieve products. In the resulted vinyl alcohol polymer, the particle size was adjusted such that the proportion of particles of 500 μm or more was 0%, and the proportion of particles of 75 μm or less was 12.0%.

Note that in the primary grinding, the time until the proportion of particles of 500 μm or more reached 30% or less, and in the grinding of the on-sieve products, the proportion of particles of 500 μm or more reached 5% or less were evaluated by a pre-test in advance. In the Examples, grinding was performed based on each time evaluated in the pre-test.

Example 2

By using the methanol solution of the vinyl acetate polymer obtained in Example 1, a vinyl alcohol polymer was obtained in the same manner as in Example 1, except that the degree of saponification of the vinyl alcohol polymer was changed to 88.2 mol %.

The particle size of the dried vinyl alcohol polymer was adjusted using a grinder in the same manner as in Example 1 such that the proportion of particles having a particle size of 500 μm or more was 0.2%, and the proportion of particles having a particle size of 75 μm or less was 8.5%.

Example 3

In a polymerization tank equipped with a reflux condenser, a dropping funnel, and a stirrer, 100 parts by mass of vinyl acetate, 0.036 parts by mass of triallyl isocyanurate, 22.1 parts by mass of methanol, and 0.06 parts by mass of Peroyl NPP (Nippon Oil & Fats Co., Ltd.) were placed, and polymerization was performed at the boiling point for 5 hours while stirring under a nitrogen stream. When the conversion rate of vinyl acetate reached 50%, polymerization was stopped and unreacted vinyl acetate was removed outside the polymerization system by a conventional method. A methanol solution of the vinyl acetate polymer having the viscosity-average degree of polymerization of 4600 was obtained.

To the methanol solution of the vinyl acetate polymer obtained above, a methanol solution of sodium hydroxide (0.007 in terms of moles of sodium hydroxide relative to the structural unit derived from vinyl acetate) was added, and a saponification reaction was performed at 45° C. for 90 minutes. The resulted reaction solution was dried by heating, and a vinyl alcohol polymer of Example 3 was obtained. The degree of saponification was 79.7 mol %.

The particle size of the dried vinyl alcohol polymer was adjusted using a grinder in the same manner as in Example 1 to obtain a vinyl alcohol polymer in which the proportion of particles having a particle size of 500 μm or more was 0.1%, and the proportion of particles having a particle size of 75 μm or less was 9.8%.

Example 4

By using a methanol solution of the vinyl acetate polymer obtained in Example 3, a vinyl alcohol polymer was obtained in the same manner as Example 3.

The dried vinyl alcohol polymer was subjected to primary grinding by a grinder, and then sieved by using a sieve having an opening of 500 μm. The on-sieve products were subjected to grinding again by a grinder and mixed well with previously obtained the under-sieve products. In the resulted vinyl alcohol polymer, the particle size was adjusted such that the proportion of particles of 500 μm or more was 0.1%, and the proportion of particles of 75 μm or less was 32.2%.

Example 5

By using a methanol solution of the vinyl acetate polymer obtained in Example 3, a vinyl alcohol polymer was obtained in the same manner as in Example 3, except that the degree of saponification of the vinyl alcohol polymer was changed to 87.6%.

Example 6

In a polymerization tank equipped with a reflux condenser, a dropping funnel, and a stirrer, 100 parts by mass of vinyl acetate, 0.013 parts by mass of allyl methacrylate, 22.1 parts by mass of methanol, and 0.04 parts by mass of Peroyl NPP (Nippon Oil & Fats Co., Ltd.) were placed, and polymerization was performed at the boiling point for 5 hours while stirring under a nitrogen stream. When the conversion rate of vinyl acetate reached 56%, polymerization was stopped and unreacted vinyl acetate was removed outside the polymerization system by a conventional method. A methanol solution of the vinyl acetate polymer was obtained. The viscosity-average degree of polymerization was 3900.

To the methanol solution of the vinyl acetate polymer obtained above, a methanol solution of sodium hydroxide (0.007 in terms of moles of sodium hydroxide relative to the structural unit derived from vinyl acetate) was added, and a saponification reaction was performed at 45° C. for 90 minutes. The resulted reaction solution was dried by heating, and a vinyl alcohol polymer of Example 6 was obtained. The degree of saponification of 80.1 mol %.

The particle size of the dried vinyl alcohol polymer was adjusted using a grinder in the same manner as in Example 1 such that the proportion of particles having a particle size of 500 μm or more was 0%, and the proportion of particles having a particle size of 75 μm or less was 9.9%.

Comparative Examples 1 to 4

As Comparative Example 1, PVA was not added. Measurement of fluid loss was performed on Comparative Example 1.

PVA of Comparative Example 2 was prepared in the same manner as in Example 1, except that the multifunctional monomer was eliminated from Example 1.

By using a methanol solution of the vinyl acetate polymer obtained in Example 1, a vinyl alcohol polymer of Comparative Example 3 was obtained in the same manner as in Example 1, except that the degree of saponification of the vinyl alcohol polymer was changed to 99 mol %.

PVA according to Comparative Example 4 was prepared in the same manner as in Example 1, except that the multifunctional monomer was eliminated and the amount of methanol placed was reduced to 5.0 parts.

[Calculation of Viscosity-Average Degree of Polymerization of Vinyl Alcohol Polymer]

With respect to each vinyl alcohol polymer according to Examples 1 to 6 and Comparative Examples 2 to 4 obtained above, the intrinsic viscosity [η] (g/dL) was measured, and the viscosity-average degree of polymerization was calculated by using the above formula (2).

[Amount of Copolymerization of Multifunctional Monomer of Vinyl Alcohol Polymer]

With respect to each vinyl alcohol polymer according to Examples 1 to 5 obtained above, the amount of copolymerization of the multifunctional monomer was calculated by using the following method.

The vinyl alcohol polymer copolymerized with triallyl isocyanurate was washed thoroughly with methanol, air dried at 90° C. for 1 hour, and then dissolved in heavy water to prepare a solution with a concentration of 10 mass %.

By using 500 MHz $^{13}$C-NMR ("AV-III HD 500" manufactured by Bruker) equipped with a DCH cryoprobe, $^{13}$C-NMR spectrum was obtained from the resulting solution at a measurement temperature of 80° C. and accumulation of 20000 times.

Based on the spectrum obtained, the integral value of peaks (30 to 50 ppm) of the backbone methylene groups not adjacent to hydroxy groups in the vinyl alcohol polymer was defined as b and the integral value of peaks (150 to 155 ppm) based on carbonyl groups in triallyl isocyanurate was defined as a. The amount of copolymerization of triallyl isocyanurate X (mol %) in the vinyl alcohol polymer copolymerized with triallyl isocyanurate was calculated by the following formula (1).

$$X = ((1/3)a/b) \times 100 \quad (1)$$

[Measurement of Fluid Loss]

The effect of reducing fluid loss of the obtained vinyl alcohol polymer of each of the Examples and Comparative Example 3 and PVA of Comparative Examples 1, 2 and 4 was measured by using a fluid loss test equipment Model 7120 manufactured by Chandler Engineering in accordance with the fluid loss evaluation method of the standards of American Petroleum Institute (API) 10B-2 (April, 2013). The oil well cement was tested by using Type G and the formulation with no addition of fly ash and no addition of bentonite under the conditions of a cement slurry density of 1900 kg/m$^3$ and a slurry yield of 0.758 m$^3$/ton. The amount of the vinyl alcohol polymer added was 0.25% bwoc at an evaluation temperature of 20° C., 0.4% bwoc at 40° C., 0.6% bwoc at 60° C., 0.8% bwoc at 80° C., and 0.8% bwoc at 100° C. As a curing retardant for cement, 0.2% bwoc of lignin sulfonate was added under the condition of 40° C., and 0.4% bwoc of lignin sulfonate was added under the condition of 60° C. or more.

The results obtained are shown in Table 1. In the Table, "TAIC" of the multifunctional monomer represents triallyl isocyanurate, and "AM" represents allyl methacrylate.

TABLE 1

| | | Example | | | | | |
|---|---|---|---|---|---|---|---|
| | | 1 | 2 | 3 | 4 | 5 | 6 |
| Vinyl acetate polymer Polymerization formulation | | | | | | | |
| Vinyl acetate | [Parts by mass] | 100 | 100 | 100 | 100 | 100 | 100 |
| Multifunctional monomer | Type | TAIC | TAIC | TAIC | TAIC | TAIC | AM |
| | [Parts by mass] | 0.010 | 0.010 | 0.036 | 0.036 | 0.036 | 0.020 |
| Methanol | [Parts by mass] | 17.0 | 17.0 | 22.1 | 22.1 | 22.1 | 17.0 |
| Vinyl acetate conversion rate | [%] | 50 | 50 | 50 | 50 | 50 | 56 |
| Vinyl acetate polymer Physical property | | | | | | | |
| Viscosity-average degree of polymerization | | 5,900 | 5,900 | 4,600 | 4,600 | 4,600 | 3,900 |
| Vinyl alcohol polymer Physical property | | | | | | | |
| Amount of copolymerization of multifunctional monomer | [mol %] | 0.0062 | 0.0062 | 0.0230 | 0.0230 | 0.0230 | — |
| Viscosity-average degree of polymerization | | 3,400 | 3,300 | 2,900 | 2,900 | 2,900 | 2,080 |
| Degree of saponification | [mol %] | 80.0 | 88.2 | 79.7 | 79.7 | 87.6 | 80.1 |
| Particle size | | | | | | | |
| 500 μm or more | [Mass %] | 0.0 | 0.2 | 0.1 | 0.1 | 0.1 | 0.0 |
| 75 μm or less | [Mass %] | 12.0 | 8.5 | 9.8 | 32.2 | 9.8 | 9.9 |
| Fluid loss test | | | | | | | |
| Test temperature 20° C. | [cc] | 12 | 14 | 12 | 18 | 12 | 22 |
| Test temperature 40° C. | [cc] | 18 | 18 | 14 | 23 | 14 | 77 |
| Test temperature 60° C. | [cc] | 16 | 27 | 14 | 120 | 16 | 196 |
| Test temperature 80° C. | [cc] | 22 | 80 | 28 | 180 | 24 | 350 |
| Test temperature 100° C. | [cc] | 170 | 230 | 102 | 330 | 88 | — |

| | | Comparative Example | | | |
|---|---|---|---|---|---|
| | | 1 | 2 | 3 | 4 |
| Vinyl acetate polymer Polymerization formulation | | | | | |
| Vinyl acetate | [Parts by mass] | — | 100 | 100 | 100 |
| Multifunctional monomer | Type | — | — | TAIC | — |
| | [Parts by mass] | — | 0.00 | 0.01 | 0.00 |
| Methanol | [Parts by mass] | — | 17.0 | 17.0 | 5.0 |
| Vinyl acetate | [%] | — | 50 | 50 | 40 |

TABLE 1-continued

| | | | | | |
|---|---|---|---|---|---|
| conversion rate<br>Vinyl acetate polymer<br>Physical property | | | | | |
| Viscosity-average degree of polymerization<br>Vinyl alcohol polymer<br>Physical property | | — | 2,800 | 5,900 | 4,900 |
| Amount of copolymerization of multifunctional monomer | [mol %] | — | — | 0.0062 | — |
| Viscosity-average degree of polymerization | | — | 2,200 | 3,300 | 3,500 |
| Degree of saponification<br>Particle size | [mol %] | — | 79.7 | 99.0 | 80.0 |
| 500 μm or more | [Mass %] | — | 0.0 | 0.4 | 0.0 |
| 75 μm or less<br>Fluid loss test | [Mass %] | — | 8.8 | 7.4 | 13.1 |
| Test temperature 20° C. | [cc] | 910 | 14 | 550 | 10 |
| Test temperature 40° C. | [cc] | — | 26 | — | 14 |
| Test temperature 60° C. | [cc] | — | 120 | — | 48 |
| Test temperature 80° C. | [cc] | — | — | — | 380 |
| Test temperature 100° C. | [cc] | — | — | — | — |

It was found from Table 1 that the additive for oil well cement containing the vinyl alcohol polymer obtained in the present invention is capable of significantly reducing fluid loss of the oil well cement even at a high temperature.

It was found from the comparison between Examples and Comparative Examples 2 and 4 that when no multifunctional monomer was copolymerized, the effect of reducing fluid loss at a high temperature becomes insufficient. It was also found from the comparison between Examples and Comparative Example 3 that even when the multifunctional monomer was copolymerized, too high a degree of saponification does not cause the effect of reducing fluid loss to be exhibited.

The present invention may include the following embodiments.

[1] An additive for oil well cement, comprising a vinyl alcohol polymer, wherein the vinyl alcohol polymer is a saponified product of a copolymer of a vinyl ester monomer and a multifunctional monomer, and the vinyl alcohol polymer has a degree of saponification of 70 to 95 mol % and a viscosity-average degree of polymerization of 1000 to 10000.

[2] The additive for oil well cement according to [1], wherein the multifunctional monomer includes a carbonyl group or an amide group.

[3] The additive for oil well cement according to [1] or [2], wherein the multifunctional monomer is triallyl isocyanurate.

[4] The additive for oil well cement according to any one of [1] to [3], wherein a structural unit derived from the multifunctional monomer in the vinyl alcohol polymer may be 0.001 to 1.0 mol % per 100 mol % of a structural unit derived from the vinyl ester monomer.

[5] The additive for oil well cement according to any one of [1] to [4], wherein a content of the vinyl alcohol polymer having a particle size of 75 μm or less is 30 mass % or less, and a content of the vinyl alcohol polymer having a particle size of 500 μm or more is 10 mass % or less.

[6] A cement slurry containing 0.01 to 30% bwoc of the additive for oil well cement according to any one of [1] to [5].

The invention claimed is:

1. A vinyl alcohol polymer, wherein
the vinyl alcohol polymer is a saponified product of a copolymer of a vinyl acetate monomer and a multifunctional monomer,
the vinyl alcohol polymer has a degree of saponification of 70 to 95 mol% and a viscosity-average degree of polymerization of 1000 to 10000,
a structural unit derived from the multifunctional monomer in the vinyl alcohol polymer is 0.001 to 0.0230 mol % per 100 mol % of a structural unit derived from the vinyl ester monomer, and
the multifunctional monomer includes two or more allyl groups.

2. The vinyl alcohol polymer according to claim 1, wherein the multifunctional monomer further includes a carbonyl group or an amide group.

3. The vinyl alcohol polymer according to claim 1, wherein the multifunctional monomer is triallyl isocyanurate.

4. The vinyl alcohol polymer according to claim 1, wherein a content of the vinyl alcohol polymer having a particle size of 75 μm or less is 30 mass % or less, and a content of the vinyl alcohol polymer having a particle size of 500 μm or more is 10 mass % or less.

5. A cement slurry comprising 0.01 to 30% bwoc of the vinyl alcohol polymer according to claim 1.

* * * * *